Feb. 20, 1934.  J. D. CAMPBELL  1,947,826
BRAKE MECHANISM
Filed July 15, 1930  2 Sheets-Sheet 1

Inventor
John D. Campbell.

Attorney.

Feb. 20, 1934.   J. D. CAMPBELL   1,947,826
BRAKE MECHANISM
Filed July 15, 1930   2 Sheets-Sheet 2
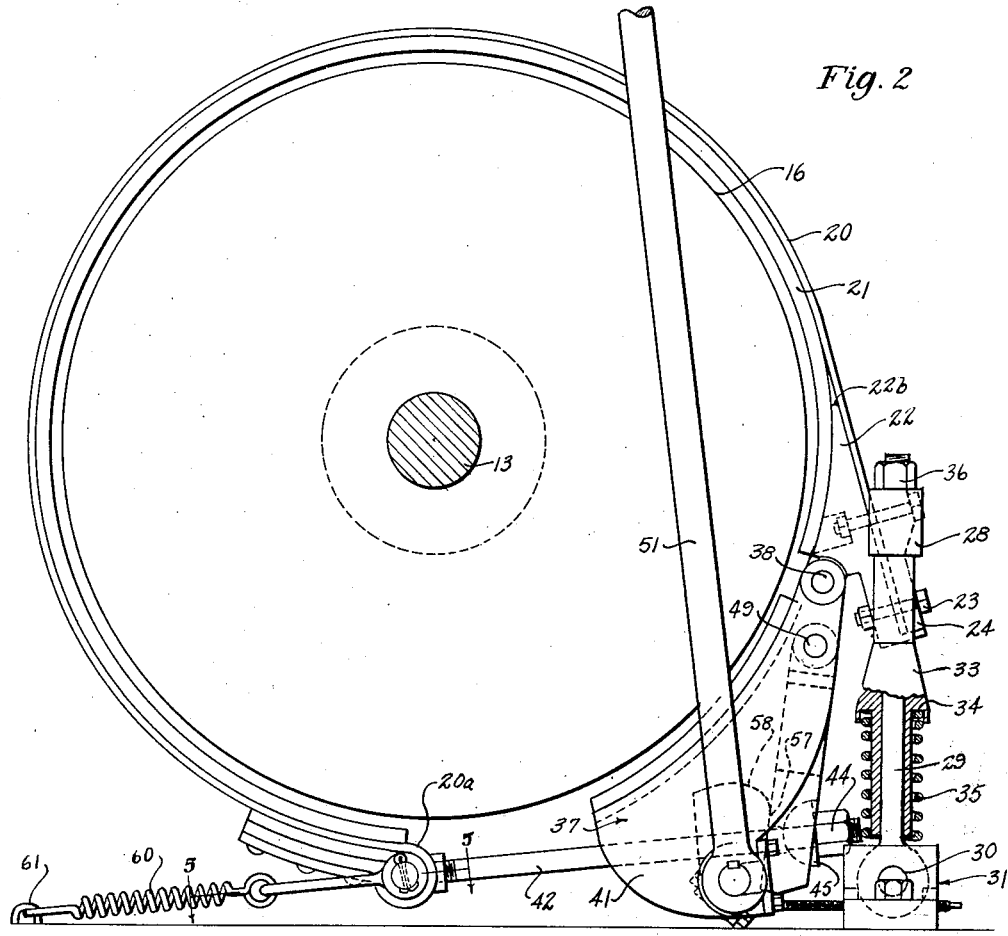
Fig. 2
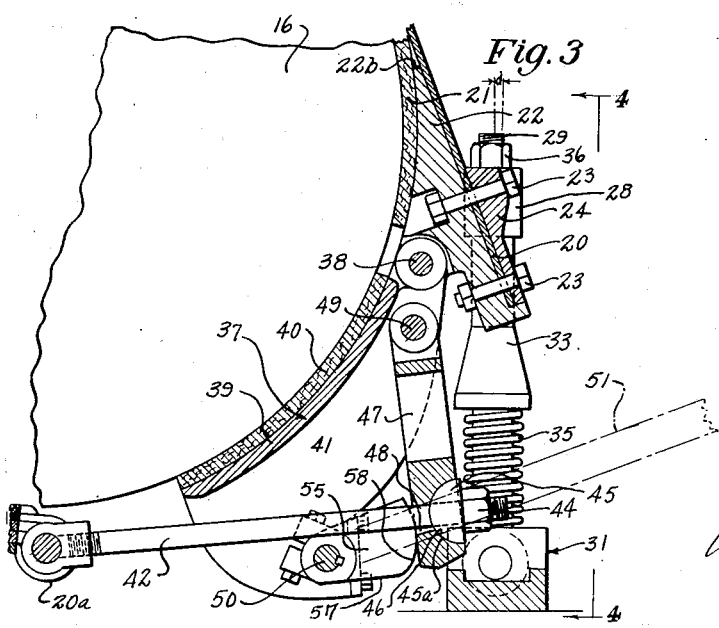
Fig. 3
*Inventor*
*John D. Campbell.*
*Attorney.*

Patented Feb. 20, 1934

1,947,826

UNITED STATES PATENT OFFICE

1,947,826

BRAKE MECHANISM

John D. Campbell, Tustin, Calif., assignor to Jay-Dee Manufacturing Co., Ltd., Tustin, Calif., a corporation of California Application July 15, 1930. Serial No. 468,041

9 Claims. (Cl. 188—77)

This invention relates generally to brakes of the drum and band type, of the class, for instance, as applied to winding reels used in oil well drilling, and is concerned particularly with improvements in the type of brake disclosed in my copending application entitled "Rotary drum brake", filed April 25, 1930, Serial Number 447,223.

The brake disclosed in said copending application provides between the brake band ends a connective element which is anchored to the floor against rotation of itself and the band in one direction, but which is permitted a limited rotation in the other direction. The brake band contracting elements and the operating lever are mounted on this connecting element, so that any movement of the connecting element with the drum upon a sudden pick-up of load, for instance, carries the contracting elements and lever along with it, and therefore no back kick can be transmitted to the brake lever by reason of the band being suddenly pulled against it.

The present invention is concerned with improvements in the brake band contracting elements mounted on the band connecting element. According to preferred form of the present invention there are embodied in the contracting elements, cam means of such characteristics that the band is contracted relatively quickly at low mechanical advantage as the lever is moved through the first part of its operating range, and then is contracted progressively more slowly at increasingly higher mechanical advantage as the lever is moved through the balance of its range to the final contracted position.

The invention will be more fully understood from the following detailed description of a present preferred embodiment thereof, reference for this purpose being had to the accompanying drawings, in which:

Fig. 2 is a side elevation of the braking mechanism in released position, the view taken on line 2—2 of Fig. 1;

Fig. 3 is a fragmentary section taken on line 3—3 of Fig. 1, but showing the mechanism in braking position;

Fig. 4 is a view taken as indicated by line 4—4 of Fig. 3, parts being removed and broken away to show its section; and Fig. 5 is a section taken as indicated by line 5—5 of Fig. 2.

Figure 1:
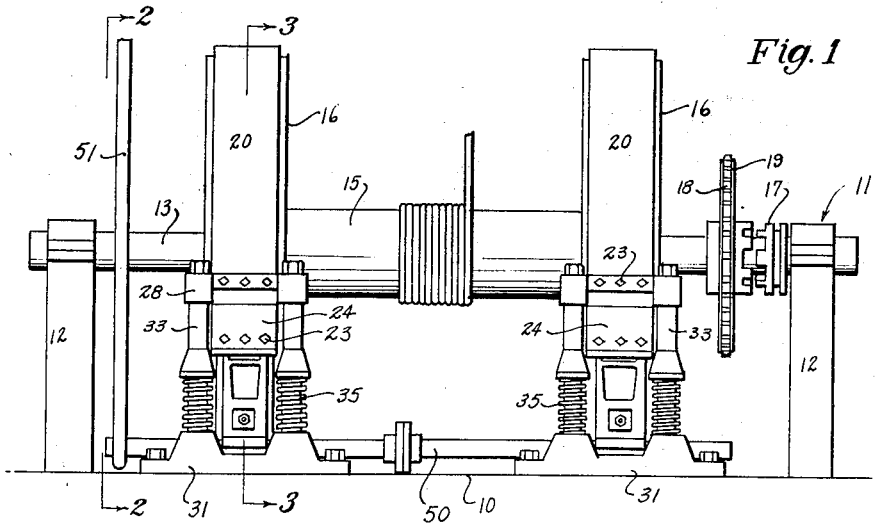
Fig. 1 is a diagrammatic side elevation of a typical draw works showing the application of my improved braking mechanism.

In Fig. 1 of the drawings the numeral 10 designates derrick flooring and the numeral 11 a draw works supported thereon. Draw works 11 includes upright supports 12 journalling a horizontal shaft 13, and fixed on shaft 13 is a winding reel 15 having brake drums 16. Shaft 13 is shown driven through a clutch 17 by means of a sprocket 18 and driving chain 19.

Around each brake drum 16 is a band 20 having a lining 21. One end of the brake band is laid over the outer face of an anchor 22, and is held by means of screws 23 between the anchor and a plate 24. Plate 24 is furnished at each edge with a perforated lug 28, and through each of the lugs 28 passes the upper end of an anchor pin 29, the lower end of which is pivoted at 30 in a suitable floor mounting member 31 so as to be capable of swinging toward and away from the drum. Surrounding each pin 29 below lug 28 is a sleeve 33 having intermediate its ends a downwardly facing shoulder 34, and confined on pin 29 between its shoulder and the upper surface of base member 31 is a coil spring 35 that tends to move sleeve 33 and lug 28 of the band holding plate 23 upwardly on pin 29 against a nut 36 on the upper end thereof, as well as holding the pin 29 yieldingly in an upright position.

This end of the brake is thus anchored to the floor through anchor 22, plate 23 and pins 29, the band pulling against the nuts 36 on the upper ends of the pins when the brake is tightened during left handed rotation of the brake drum. The reason for the movability of lugs 28 on the pins 29 is described hereinafter.

The inner surface of anchor 22 conforms to the curvature of the brake drum, and the lower end of the lining 21 is separated from the band at the upper pointed end 22b of the anchor and is carried by the inner surface of the anchor to engage the surface of the drum when the brake is tightened.

A brake shoe 37 carrying the contracting mechanism for the brake band is pivoted to the lower edge of anchor 22 by means of a pin 38. Shoe 37 comprises an inner plate 39 conforming to the curvature of the drum and having a drum engageable lining 40 and spaced side plates 41 between and on which is mounted the band contracting mechanism.

The other end of the band 20 is pivotally connected at 20a to the rear end of a bolt 42, on the forward end of which is screw-threaded a nut 44, and on bolt 42 behind nut 44 is a washer element 45 having a rounded semi-cylindric, convex rear face 45a which bears against a concave face 46 of like curvature formed on a swinging arm 47, the bolt 42 passing through an opening 48 leading from the surface 46 through the arm. Opening 48 is vertically elongated to provide for vertical movement of the bolt relative to the arm, as clearly shown in the drawings. The upper end of arm 47 is pivoted at 49 between the side plates 41 of the shoe. It will be understood that swinging movement of arm 47 to the right, from the position of Fig. 2 to the position of Fig. 3, causes movement of washer element 45 and bolt 42 to the right to tighten the band, the convex washer surface 45a sliding on the concave arm surface 46 during this movement.

Such movement of arm 47 is accomplished by the following preferred means. Journaled in the side plates 41 of the shoe below bolt 42 is a transverse rock shaft 50, and keyed upon shaft 50 is an operating lever 51. In cases where two laterally spaced brakes are used, as illustrated in Fig. 1, a single rock shaft 50 can be used for both shoes. Mounted on shaft 50 between the two side plates 41 of each shoe is a cam element 55 embodying a pair of cams 56 spaced one on each side of bolt 42. These cams 56 bear on the rear face of arm 47, as shown. Operation of lever 51 then rotates shaft 50 to work the cams against arm 47 and thereby cause movement of the arm to tighten the brake band.

The cam 56 can be shaped to give any operating characteristics required. I show, however, a straight face 57 which is initially in engagement with the arm 47 in the released position of Fig. 2, and a curved surface 58 merging from the straight face 57.

In the fully released position of Fig. 2 the cam is in such a position as first to act at low mechanical advantage but to cause relatively quick movement of arm 57 as the operating lever is moved toward the right. As the lever is further moved, however, and the point of engagement of the cam with the arm progresses around the curved end surface of the cam, the amount of movement imparted to the arm by a given amount of lever movement rapidly decreases, while the mechanical advantage of the device correspondingly increases, until as the brake is finally tightened the mechanical advantage is very high. The cam surface 58 is made of sufficient length and the bolt 42 so adjusted, of course, that the band can be fully tightened before the limit of the movement which the cam is capable of imparting to the arm is reached.

It will thus be understood how movement of lever 51 from the released position of Fig. 2 to the right will cause the cams 56 to swing the arm 47 to the right, which draws bolt 42 toward the right and thereby draws together the lower end of the brake band and the shoe to contract the band tightly around the drum, while shoe 37 pivots inwardly at 38 until it also engages the drum.

As the brake band is tightened the anchoring rods 29 rock slightly toward the drums to permit the anchors 22 and shoe 37 to move in to engage the drum, the amount of such movement of the upper ends of the rods being indicated at d in Fig. 3. When the brake band is released the springs 35 act to move the rods back to the upright position, thereby clearing anchor 22 from the drum, as clearly shown in Fig. 2.

In typical operation, the winding drum may rotate left handedly, as viewed in Fig. 2, in paying out a cable reeled thereon, the brake being actuated to regulate the rate of paying out or to stop and hold the cable, it being understood that the load on the cable may be very great and the brakes will accordingly be very tightly held. When it is desired to rewind the cable, the clutch 17 is engaged and shaft 13 and drum 15 driven through sprocket 18. Now when clutch 17 is thus engaged, the brake drums, around which the bands are still tightly clamped, are immediately and suddenly rotated toward the right, and before the bands can be freed from the drum they are carried for a short distance therewith, members 28 moving down on anchor pins 29 and springs 35 yielding in such movement. Now if the brake operating lever were to be mounted on the floor, as in past practice, the forwardly moving band would cause a sharp and dangerous back-kick to be given to the operating lever before the band could be released from the drum, as is well known in the art from practical experience. And this back-kick is not simply the motion of the band with the drum as the drum starts to rotate, but is that motion multiplied by the leverage ratio of the operating lever to the band. In the present case, however, the brake lever is fulcrumed on the brake band connecting element or shoe itself, and is therefore free to rotate bodily with the band, which it does until the band is freed of the drum. The lever thus has, in such movement, no fulcrumal movement whatever, and the bodily movement which it does have is not magnified through the mechanical advantage ratio of the lever. This right-handed rotative movement of the band and shoe takes place, as above mentioned, against the springs 35 surrounding the anchor pins 29, the brake band anchor 22 moving plate 24 and sleeves 33 downwardly against the springs to a certain position where the lever is finally released and the drum breaks from the band. Thus as the clutch is engaged and the drum starts to rotate to pick up the load, the tightly clamped band rotates with the drum for a short distance against the force of the springs 38 until the band can be released; and since the fulcrum of the operating lever moves with the band in such movement, no back-kick can be imparted to the lever.

The primary function of springs 35 in this connection, however, is merely to hold the band and drum normally in the position of Figs. 2 and 3 and to restore them to that position whenever circumferentially rotated therefrom as the drum rotates right handedly, as viewed in the figures, rather than to oppose motion in that direction. As far as the latter action is concerned the springs might be omitted, the inertia of the parts being relied upon to take up any shock. The springs do however aid in releasing the band by yieldingly opposing movement of the anchored end of the band.

For the purpose of retracting the bolt 42 when the operating lever is moved from the position of Fig. 3 to that of Fig. 2 in releasing the brake, there may be connected to the rear end of the bolt 42 a tension spring 60 (see Fig. 5), which is attached to a suitable fixed support 61, this spring acting constantly to urge the bolt 42 and the arm 47 toward the position of Fig. 2 to cause release of the band.

It will now be understood that I have provided a brake which is strong in construction, positive and sure in action, and in which the change in mechanical advantage as the brake is contracted may be at any varying rate desired, depending upon the character of cam means provided.

While I have now illustrated and described certain specific means for carrying out an embodiment of my invention, it will be obvious that various changes in design, structure and arrangement may be effected without departing from the spirit and scope of my invention; and it is therefore to be understood that all such changes are contemplated within the scope of my invention as expressed in the following claims.

I claim:

1. A brake embodying the combination of a drum and a band with two ends, a brake shoe flexibly mounted on one end of the band and bodily movable with said band around the drum, anchoring means yieldingly restraining said band and brake shoe against such rotation, a swinging arm having a pivot mounting on said brake shoe, a connection between the swinging end of said arm and the other end of said band, a cam having a pivotal mounting also on said brake shoe and arranged for operation of said swinging arm, and cam operating means embodying a lever pivotally mounted on said brake shoe.

2. A brake embodying the combination of a drum and a band with two ends, a brake shoe flexibly mounted on one end of the band and bodily movable with said band around the drum, anchoring means yieldingly restraining said band and brake shoe against such rotation, a swinging arm having a pivot mounting on said brake shoe, a connection between the swinging end of said arm and the other end of said band, a shaft journaled in said brake shoe, operative interconnection means between said shaft and said swinging arm embodying a varying ratio cam, and an operating lever on said brake shoe mounted shaft.

3. A brake embodying the combination of a drum and a band with two ends, a connective element flexibly mounted on one end of the band and bodily movable with said band around the drum, anchoring means yieldingly restraining said band and connective element against such rotation, a swinging arm having a pivot mounting on said connective element, a connection between the swinging end of said arm and the other end of said band, a cam having a pivotal mounting also on said connective element and arranged for operation of said swinging arm, and cam operating means embodying a lever pivotally mounted on said connective element.

4. A brake embodying the combination of a drum and a band with two ends, a connective element flexibly mounted on one end of the band and bodily movable with said band around the drum, anchoring means yieldingly restraining said band and connective element against such rotation, a swinging arm having a pivot mounting on said connective element, a connection between the swinging end of said arm and the other end of said band, a cam having a pivotal mounting also on said connective element and bearing on said swinging arm for operation thereof, and cam operating means embodying a lever pivotally mounted on said connective element.

5. A brake embodying the combination of a drum and a band with two ends, a connective element flexibly mounted on one end of the band and bodily movable with said band around the drum, anchoring means yieldingly restraining said band and connective element against such rotation, a swinging arm having a pivot mounting on said connective element, a connection between the swinging end of said arm and the other end of said band, a shaft journaled in said connective element, operative interconnection means between said shaft and said swinging arm embodying a varying ratio cam, and an operating lever on said connective element mounted shaft.

6. A brake embodying the combination of a drum and a band with two ends, a brake shoe flexibly mounted on one end of the band and bodily movable with said band around the drum, anchoring means yieldingly restraining said band and brake shoe against such rotation, a swinging arm having a pivot mounting on said brake shoe, a connection between the swinging end of said arm and the other end of said band, a brake operating lever arm pivotally mounted on said brake shoe, and an operative connection between said lever arm and said swinging arm comprising a cam element.

7. A brake embodying the combination of a drum and a band with two ends, a connective element flexibly mounted on one end of the band and bodily movable with said band around the drum, anchoring means yieldingly restraining said band and connective element against such rotation, a swinging arm having a pivot mounting on said connective element, a connection between the swinging end of said arm and the other end of said band, a brake operating lever arm pivotally mounted on said connective element, and an operative connection between said lever arm and said swinging arm comprising a cam element.

8. A brake embodying the combination of a drum and a band with two ends, a brake shoe flexibly mounted on one end of the band and bodily movable with said band circumferentially of the drum, a swinging arm having a pivot mounting on said brake shoe, a link connection between the swinging end of said arm and the other end of the band, a brake operating lever arm pivotally mounted on said brake shoe, means operated by said lever arm for swinging said arm on said shoe, said means involving a cam element, and band anchoring means adapted to anchor the band and shoe against circumferential rotation with the drum beyond a normal inactive limiting position with one direction of drum rotation and to allow a limited circumferential rotation of the band and shoe with the drum from said limiting position with the other direction of drum rotation.

9. A brake embodying the combination of a drum and a band with two ends, a brake shoe flexibly mounted on one end of the band and bodily movable with said band circumferentially of the drum, a swinging arm having a pivot mounting on said brake shoe, a link connected with the other end of the band, a bearing member on said link having a convex rounded surface bearing on a complementary concave surface formed on the swinging end of said arm, a brake operating lever arm pivotally mounted on said brake shoe, means operated by said lever arm for swinging said arm on said shoe to contract the band, said means involving a cam element, and band anchoring means adapted to hold the band and shoe within given limits of bodily rotation circumferentially of the drum.

JOHN D. CAMPBELL.